(12) United States Patent
Uchida

(10) Patent No.: US 7,729,040 B2
(45) Date of Patent: Jun. 1, 2010

(54) ELECTROPHORETIC DISPLAY DEVICE AND ELECTRONIC APPARATUS

(75) Inventor: Masami Uchida, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/389,591

(22) Filed: Feb. 20, 2009

(65) Prior Publication Data

US 2009/0231676 A1 Sep. 17, 2009

(30) Foreign Application Priority Data

Mar. 14, 2008 (JP) ............................. 2008-066227

(51) Int. Cl.
G02B 26/00 (2006.01)
G02B 26/08 (2006.01)
G09G 3/34 (2006.01)

(52) U.S. Cl. ................... 359/296; 359/295; 359/297; 359/298; 345/107

(58) Field of Classification Search ......... 359/295–298; 430/31–32; 345/107

See application file for complete search history.

(56) References Cited

U.S. PATENT DOCUMENTS

2006/0132428 A1* 6/2006 Liu et al. ................. 345/107
2008/0285114 A1* 11/2008 Lee et al. ................. 359/296

FOREIGN PATENT DOCUMENTS

| JP | 2003-186065 | 7/2003 |
| JP | 2005-242233 | 9/2005 |
| JP | 2006-150755 | 6/2006 |
| JP | 2006-227470 | 8/2006 |

* cited by examiner

Primary Examiner—Jessica T Stultz
Assistant Examiner—Mahidere S Sahle
(74) Attorney, Agent, or Firm—AdvantEdge Law Group, LLC

(57) ABSTRACT

An electrophoretic display device includes; a first substrate having a plurality of pixel electrodes in a display region thereof; and an electrophoretic sheet that includes a second substrate on which a common electrode, an electrophoretic layer, and an adhesive layer are laminated. The electrophoretic sheet is bonded to the display region of the first substrate via the adhesive layer. The distance between neighboring pixel electrodes among the plurality of pixel electrodes is 5 μm or more.

4 Claims, 6 Drawing Sheets

ELECTROPHORETIC DISPLAY DEVICE AND ELECTRONIC APPARATUS

BACKGROUND

1. Technical Field

The present invention relates to an electrophoretic display device and an electronic apparatus.

2. Related Art

In recent years, electrophoretic display devices have come to be used as display devices for electronic paper, dial plates of watches, etc. An electrophoretic display device is provided with an electrophoretic dispersion liquid that contains a liquid-phase dispersion medium and electrophoretic particles, and forms visible images by changing the optical characteristics of the electrophoretic dispersion liquid by rearranging the electrophoretic particles using an applied electric field (see JP-A-2006-150755, for example). An electrophoretic display device has a wide viewing angle, high contrast, and in addition, a capability of maintaining display of images (memory function), allowing minimum power consumption. Therefore, an electrophoretic display device has drawn attention as a next-generation display device.

Examples of typical specific structures of electrophoretic display devices include a structure in which an electrophoretic sheet is bonded onto a display region of an element substrate on which a plurality of pixel electrodes and elements are formed, and a protection substrate is bonded onto the electrophoretic sheet. The electrophoretic sheet has a structure in which an electrophoretic layer and an adhesive layer are laminated onto a common substrate, and is bonded onto the element substrate via the adhesive layer. In such an electrophoretic display device, the electrophoretic particles are rearranged by an applied electric field between pixel electrodes and a common electrode. In recent years, the distance between neighboring pixel electrodes has been gradually narrowed to realize high-resolution display. Advances in technology in recent years have even made it possible to form neighboring pixel electrodes spaced with a distance of 1 µm or less.

However, decreasing the distance between neighboring pixel electrodes may cause a problem in that an electric field which leaks from a certain pixel electrode is applied to the neighboring pixel electrodes. The leakage electric field, though weak, may cause the displayed information of the neighboring pixel electrodes to change, when applied for a certain amount of time. This is known as a so-called cross-talk phenomenon.

In the case of a structure in which an electric potential is applied to a pixel electrode (segment electrode, for example) from the back side via a through hole, there is a problem in that an electric field having insufficient strength is applied to a portion of the display region corresponding to the through hole, causing a dot or circle of uneven contrast.

The known electrophoretic display device thus has a problem in that display quality is deteriorated by a cross-talk phenomenon, among others.

SUMMARY

An advantage of some aspects of the present invention is that it provides an electrophoretic display device and an electronic apparatus that can maintain favorable quality of display.

According to a first aspect of the invention, an electrophoretic display device includes; a first substrate having a plurality of pixel electrodes in a display region thereof; and an electrophoretic sheet that includes a second substrate on which a common electrode, an electrophoretic layer, and an adhesive layer are laminated. The electrophoretic sheet is bonded to the display region of the first substrate via the adhesive layer. A distance between neighboring pixel electrodes among the plurality of pixel electrodes is 5 µm or more.

The inventor has found that when a distance between neighboring pixel electrodes is 5 µm or more, the neighboring pixel electrodes will be less affected by each other's leakage electric fields. According to the first aspect of the invention, since the distance between neighboring pixel electrodes among the plurality of pixel electrodes is made to be 5 µm or more, the neighboring pixel electrodes will be less affected by each other's leakage electric fields, and hence unfavorable influence of cross-talk is alleviated. This allows favorable display quality to be maintained.

In the above-described electrophoretic display device, it is preferable that the distance between neighboring pixel electrodes among the plurality of pixel electrodes be 100 µm or less.

In this case, since the distance between neighboring pixel electrodes among the plurality of pixel electrodes is made to be 100 µm or less, high-resolution display is realized while influence of cross-talk is alleviated.

In the above-described electrophoretic display device, it is preferable that the first substrate have a switching element corresponding to each of the plurality of pixel electrodes.

In this case, favorable display quality is maintained, since influence of cross-talk is alleviated in a so-called active matrix structure in which the first substrate has a switching element corresponding to each of the plurality of pixel electrodes.

In the above-described electrophoretic display device, the plurality of pixel electrodes may be a plurality of segment electrodes arranged in a specified pattern.

In this case, favorable display quality is maintained, since influence of cross-talk is alleviated in a so-called segmented display structure in which the plurality of pixel electrodes are a plurality of segment electrodes arranged in a specified pattern.

In the above-described electrophoretic display device having a segmented display structure, it is preferable that the electrophoretic display device include; a through hole provided for each of the plurality of segment electrodes in such a manner as to extend through the first substrate and one of the segment electrodes, at a position that overlaps the segment electrode in plan view; and a connecting part, formed along and covering an inner surface of the through hole, one end of which is connected to the segment electrode and the other end of which is connected to a surface of the first substrate opposite a surface having the pixel electrodes, where the connecting part has a continuous hole that continues from one end to the other end of the connecting part, located at a central portion of the connecting part in plan view, and the continuous hole has a diameter of 100 µm or less.

In this case, a region provided with a continuous hole can be prevented from becoming a non-display region, since the electrophoretic display device includes; a through hole provided for each of the plurality of segment electrodes in such a manner as to extend through the first substrate and one of the segment electrodes, at a position that overlaps the segment electrode in plan view; and a connecting part, formed along and covering an inner surface of the through hole, one end of which is connected to the segment electrode and the other end of which is connected to a surface of the first substrate opposite a surface having the pixel electrodes, where the connecting part has a continuous hole that continues from one end to the other end of the connecting part, located at a central portion of the connecting part in plan view, and the continuous hole has a diameter of 100 µm or less. Hence, degradation in display quality is avoided more reliably, and favorable display quality is maintained in a segmented display structure.

According to a second aspect of the invention, an electronic apparatus includes the above-mentioned electrophoretic display device.

In accordance with the second aspect of the invention, an electronic apparatus that has high-grade display characteristics is realized, since the electronic apparatus is provided with the electrophoretic display device that can maintain favorable display quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
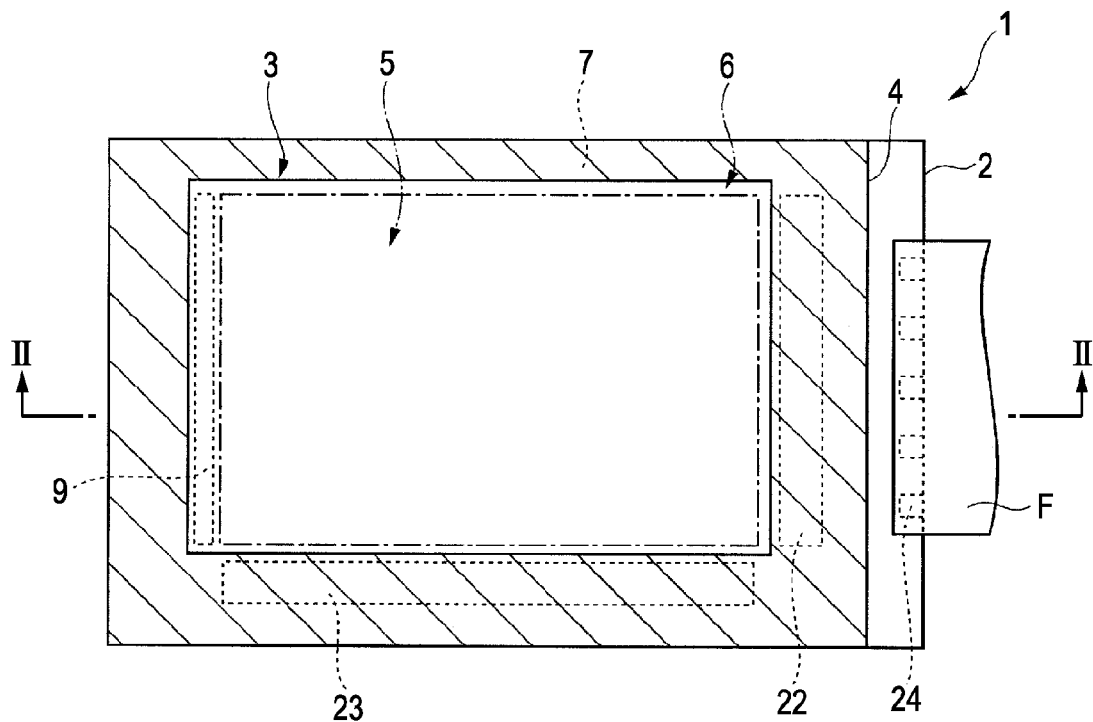
FIG. 1 is a plan view showing a structure of an electrophoretic display device according to a first embodiment of the invention.

A first embodiment of the invention will be described below with reference to the drawings. In this embodiment, an active-matrix electrophoretic display device is described as an example. In the drawings, in order to make the individual layers and components recognizable, different scales are used for the individual layers and components.

Figure 2:
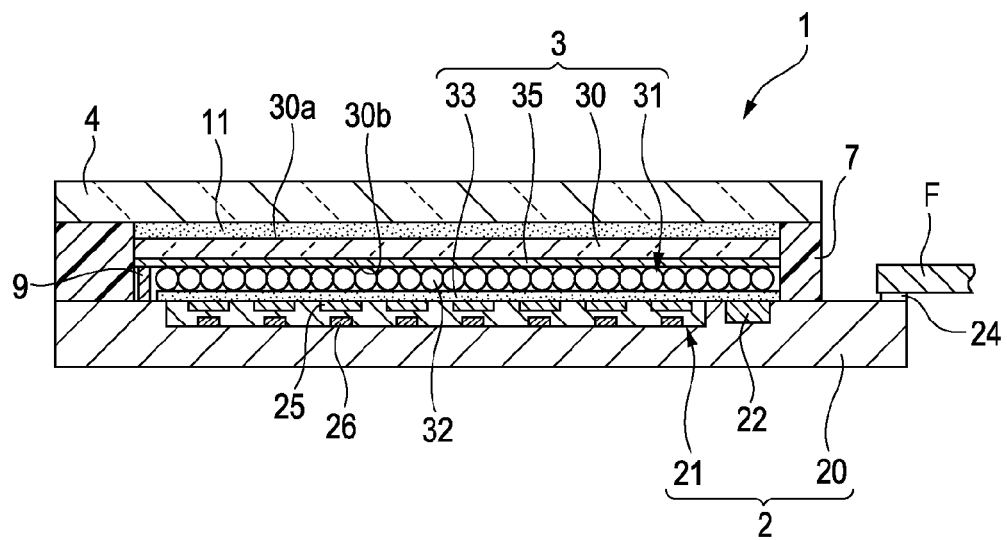
FIG. 2 is a sectional view of the electrophoretic display device.

FIG. 1 is a plan view schematically showing a structure of an electrophoretic display device 1 according to the first embodiment of the invention. FIG. 2 is a sectional view taken along the line II-II of FIG. 1.

As shown in FIGS. 1 and 2, the electrophoretic display device 1 is provided with an element substrate 2, an electrophoretic sheet 3, and a glass cover 4. The electrophoretic display device 1 has a structure in which the electrophoretic sheet 3 is bonded onto the surface of the element substrate 2, and the glass cover 4 is disposed on the surface of the electrophoretic sheet 3.

The electrophoretic display device 1 is provided with a display region 5 for displaying images such as still images or motion pictures. Within the display region 5, a plurality of pixel elements arrayed in a matrix are provided. Each of the pixel elements independently displays a piece of information. A peripheral region surrounding the display region 5 is a non-display region 6 where no image is displayed. In the non-display region 6, no pixel elements are provided, and instead driving circuit elements 22 and 23 and terminals 24, among others, are provided.

The element substrate 2 includes a substrate 20 and a driving layer 21, disposed on the substrate 20, that includes pixel electrodes and elements. Examples of the substrate 20 include an inorganic substrate made of a material such as glass, quartz, silicon, and gallium arsenide and a plastic substrate (resin substrate) made of a material such as polyimide, polyethylene terephthalate (PET), polyethylene naphthalate (PEN), polymethylmethacrylate (PMMA), polycarbonate (PC), polyether sulfone (PES), and aromatic polyester (liquid crystal polymer).

The driving layer 21 is formed in a region of the substrate 20 corresponding to the display region 5. The driving layer 21 includes pixel electrodes 25 each provided for a corresponding pixel, switching elements 26, and data lines and scanning lines (not shown) connected to the switching elements 26, among others. The display region 5 is substantially the same, in terms of size and shape, as a planar region in which the driving layer 21 is formed, and the driving circuit elements 22 and 23 are disposed in the peripheral portion (the non-display region 6) of the driving layer 21. The driving circuit elements 22 and 23 are electrically connected to the data lines and scanning lines and provide signals to the driving layer 21. The plurality of terminals 24 are provided at the end (right end in the figure) of the element substrate 2, and are connected to the driving circuit elements 22 and 23 through wiring (not shown) formed on the element substrate 2. The terminals 24 are connected to an external circuit board F.

The electrophoretic sheet 3 includes a transparent substrate 30, a common electrode 35, an electrophoretic layer 31, and an adhesive layer 33.

The transparent substrate 30, which holds the electrophoretic layer 31, is a rectangular substrate made of a material having high optical transparency, such as polyethylene terephthalate (PET), polyether sulfone (PES), and polycarbonate (PC). An upper surface 30a of the transparent substrate 30 is the viewing side of the electrophoretic display device 1.

The common electrode 35 is formed on substantially the entirety of a lower surface 30b of the transparent substrate 30. The common electrode 35 is made of a conductive material having high optical transparency such as indium tin oxide (ITO), and is connected to the element substrate 2 through a vertically connecting conductor 9.

The electrophoretic layer 31 includes a plurality of microcapsules 32.

The microcapsules 32 are substantially spherical capsules in which an electrophoretic dispersion liquid is enclosed. The microcapsules 32 have substantially the same diameter (40 µm to 50 µm). Examples of a material of walls of the microcapsules 32 include compounds such as a composite material of gum arabic and gelatin, urethane resin, and urea resin. The electrophoretic dispersion liquid enclosed in the microcapsules 32 contains a plurality of electrophoretic particles and a liquid-phase dispersion medium for dispersing the electrophoretic particles.

Examples of materials that can be used as the liquid-phase dispersion medium include one of the following materials, to which an additive such as a surface acting agent is added: water, alcohol solvents, various esters, ketones, aliphatic hydrocarbons, alicyclic hydrocarbons, aromatic hydrocarbons, halogenated hydrocarbons, carboxylates, and other various oils.

Examples of particles that can be used as the electrophoretic particles include organic or inorganic particles (macromolecules or colloid) that have a property to migrate electrophoretically in accordance with an electric potential difference in the liquid-phase dispersion medium. Specifically, one or more of the following materials may be used: black pigments such as carbon black and aniline black; white pigments such as titanium dioxide; yellow pigments such as isoindolinone and azo pigments like monoazo; red pigments such as quinacridone red and azo pigments like monoazo; blue pigments such as phtalocyanine blue; and green pigments such as phtalocyanine green. To these pigments, the following additives may be added as required: an electrolyte; a surface acting agent; a charge control agent composed of particles of, for example, metal soap, resin, rubber, oil, varnish, and compounds; a dispersion agent such as a titanium coupling agent, an aluminum coupling agent, and a silane coupling agent; a lubricant agent; and a stabilizing agent.

For example, two kinds of electrophoretic particles are enclosed in the microcapsules 32; titanium dioxide particles as white pigments and carbon black particles as black pigments. Here, one of the two kinds of particles is positively charged and the other is negatively charged. Needless to say, other kinds of electrophoretic particles may be used. Alternatively, electrophoretic particles only of one kind may be used, where information is displayed by migrating the particles to either the common electrode side or the pixel-element electrode side.

The adhesive layer 33, with a thickness of about 50 μm, is made of an adhesive. It is desirable that the adhesive used for the adhesive layer 33 have good affinity with the walls of the microcapsules 32, good adhesiveness to the common electrode 35 and the pixel electrodes 25, and good insulation properties. The adhesive may be a heat curable adhesive; however, it is desirable in this case that the adhesive have elasticity after being heat-cured.

Examples of a material suitable for the glass cover 4 include a glass with high optical transparency, good flatness, and scratch resistance. Specifically, inorganic glass or crystal glass may be used, among others. Sapphire glass or acrylic glass may also be used. The glass cover 4 is bonded to the electrophoretic sheet 3 via a transparent adhesive layer 11 such as a double-sided adhesive sheet. Between the glass cover 4 and the element substrate 2, a seal member 7 is provided. Examples of a material composing the seal member 7 include resins such as epoxy resin, acrylic resin, and silicone resin. The seal member 7 in the first embodiment is composed of an epoxy resin.

The electrophoretic layer 31, sandwiched between the element substrate 2 and the transparent substrate 30, is covered with the glass cover 4, and is further sealed with the seal member 7 at its peripheral portion. This structure, in which the electrophoretic layer 31 is fully covered, prevents influx of moisture that may cause defective display and deterioration of the characteristics of the electrophoretic layer 31. When flexibility is required for the display device 1, the glass cover 4 that is rigid may not be used. In this case, a flexible display device is realized by using the transparent substrate 30 itself as a display surface.

Figure 3:
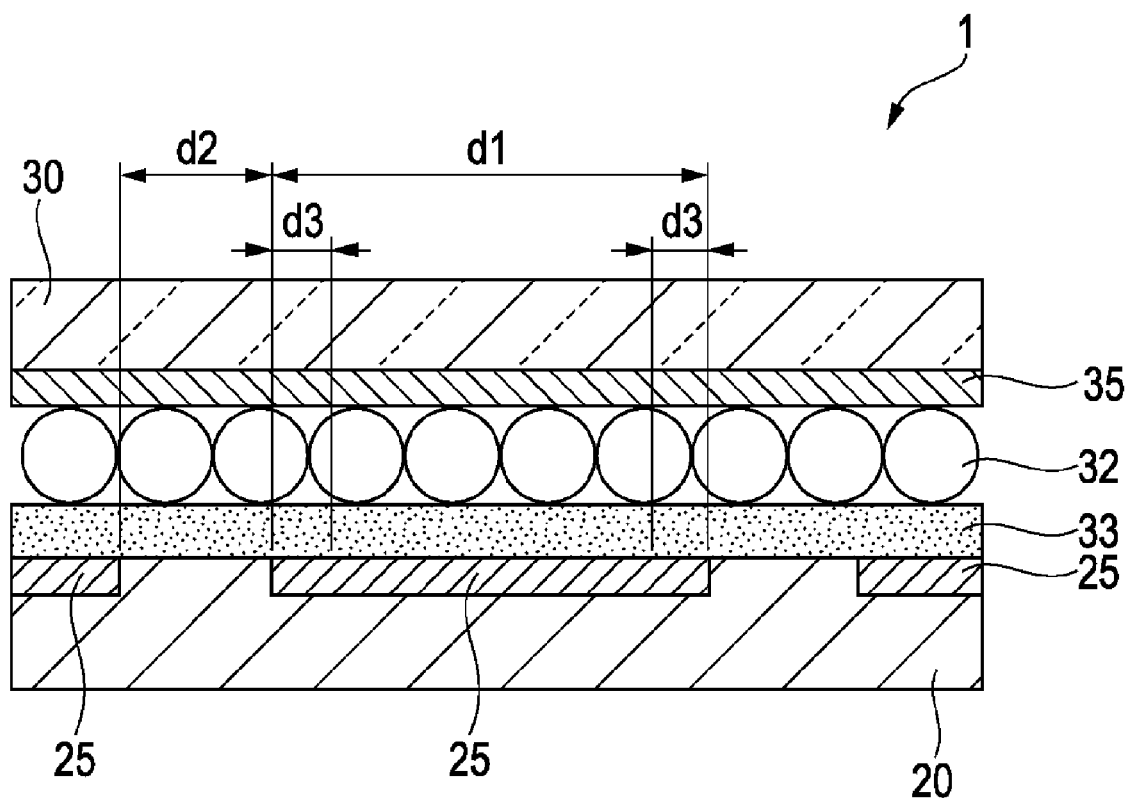
FIG. 3 is a magnified sectional view of the electrophoretic display device.

FIG. 3 is a magnified sectional view of the electrophoretic display device 1 showing the structure of the pixel electrodes 25.

As shown in the figure, each of the pixel electrodes 25 has a left-right width d1, which is approximately 80 μm, and is arranged such that it is spaced apart from neighboring pixel electrodes by a distance d2. The distance d2, which is preferably in a range from 5 to 100 μm, is chosen to be 8 μm in the first embodiment. By making the distance d2 be 5 μm or more, regions with a width d3 that are influenced by neighboring pixel electrodes are prevented from becoming too large, and hence, deterioration in the display quality is avoided. By making the distance d2 be 100 μm or less, an excessively wide non-display region is avoided and hence, a high display resolution is maintained. When the distance d2 is 8 μm, the width d3 of the regions that are influenced by the neighboring pixel electrodes 25 are approximately 10 μm, and hence, an uninfluenced pixel region of sufficient size (having a width given by d1−2×d3) is kept, resulting in nearly no perceived influence on display.

Note that the separation between the pixel electrodes 25 and the common electrode 35 is approximately 90 to 100 μm, which is the sum of the height of each of the microcapsules 32 and the thickness of the adhesive layer 33, and the above-described distance d2 is determined on the basis of this separation. Hence, when the separation is other than 90 to 100 μm, the distance d2 can be appropriately derived on the basis of the ratio of the separation and the distance d2.

Hereinafter, the operation of the electrophoretic display device 1 having the structure described above is briefly explained.

When a voltage is applied between the pixel electrodes 25 and the common electrode 35 in such a manner that the common electrode 35 has a higher voltage than the pixel electrodes 25, positively charged black electrophoretic particles within the microcapsules 32 are pulled to the pixel electrode 25 side of each of the microcapsules 32 by Coulomb force. On the other hand, negatively charged white electrophoretic particles within the microcapsules 32 are pulled to the common electrode 35 side of each of the microcapsules 32. As a result, white electrophoretic particles in the microcapsules 32 gather in the transparent substrate 30 side of each of the microcapsules 32, and the (white) color of the white electrophoretic particles is displayed in the display region 5 of the electrophoretic display device 1.

Conversely, when a voltage is applied between the pixel electrodes 25 and the common electrode 35 in such a manner that the pixel electrodes 25 have a higher voltage than the common electrode 35, negatively charged white electrophoretic particles within the microcapsules 32 are pulled to the pixel electrode 25 side of each of the microcapsules 32 by Coulomb force. On the other hand, positively charged black electrophoretic particles within the microcapsules 32 are pulled to the common electrode 35 side of each of the microcapsules 32 by Coulomb force. As a result, black electrophoretic particles in the microcapsules 32 gather in the transparent substrate 30 side of each of the microcapsules 32, and the (black) color of the black electrophoretic particles is displayed in the display region 5 of the electrophoretic display device 1.

Figure 4A:
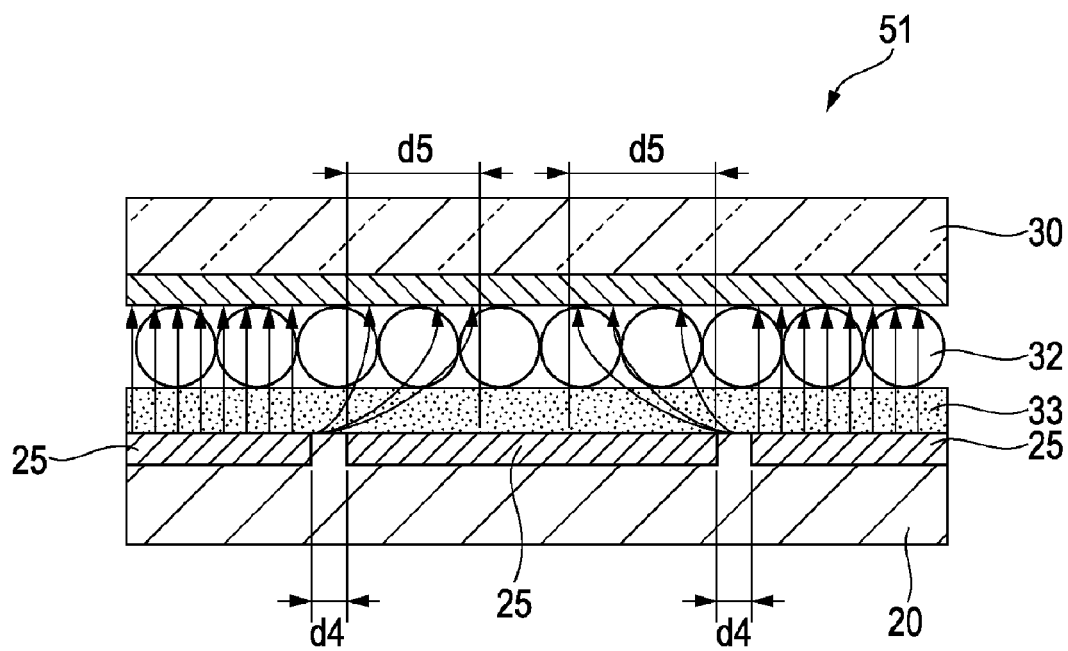
FIGS. 4A and 4B illustrate electric fields generated in the electrophoretic display device.
Figure 4B:
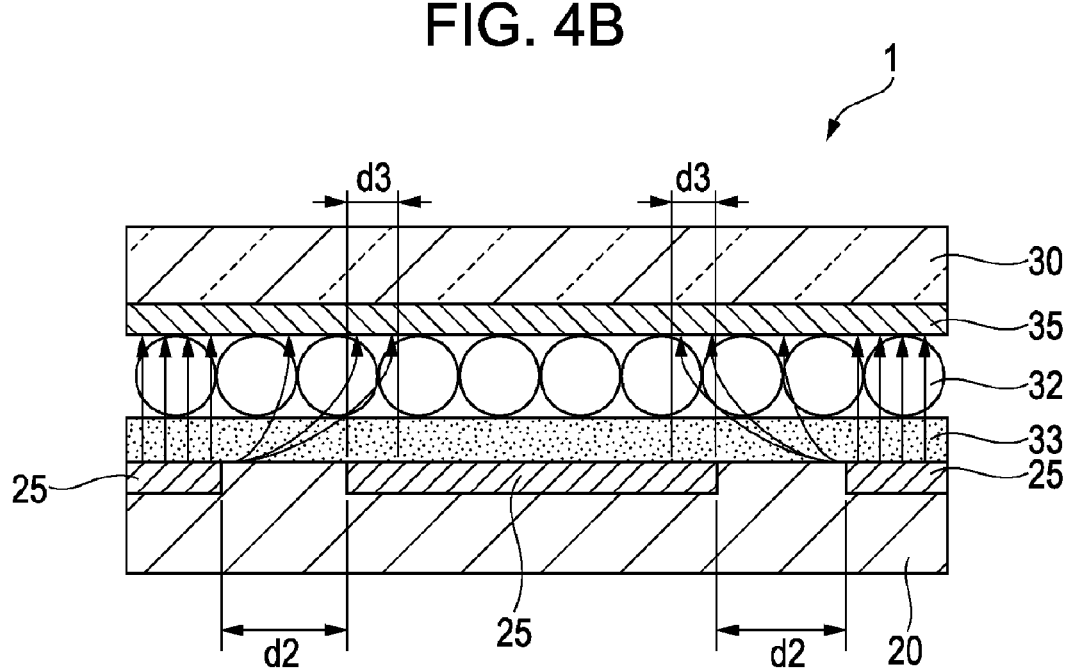

FIGS. 4A and 4B show electric fields generated by applying a voltage such that the pixel electrodes 25 have a higher potential than the common electrode 35. FIG. 4A shows an electrophoretic display device 51 according to a known structure, and FIG. 4B shows the electrophoretic display device 1 according to the first embodiment. For ease of explanation, components of the electrophoretic display device 51 according to the known structure that are the same as those of the electrophoretic display device 1 according to the first embodiment are denoted by the same reference numerals.

As shown in FIGS. 4A and 4B, three pixel electrodes 25 are disposed in the left-right direction in the figures. When a voltage is applied, for example, to both the left and right pixel electrodes 25 among the three pixel electrodes 25, radial electric fields are generated at the ends of the left and right pixel electrodes 25 which are closer to the central pixel electrode, and extend to the regions above the neighboring central pixel electrode 25. These radial leakage fields will have unfavorable influence on the microcapsules provided above the neighboring pixel electrode 25.

A distance d4 between neighboring pixel electrodes 25 in the known structure of FIG. 4A is generally smaller than the distance d2 between neighboring pixel electrodes 25 of the above-described embodiment, and is even 1 μm or less in some cases. Hence those regions, having a width d5, above the central pixel electrode 25 that are influenced by the radial electric fields are accordingly wider. Since a region above the pixel electrode that contributes to stable display is a region other than the regions having the width d5, the region of stable display without cross-talk is very limited in the known structure.

In contrast, in the structure of the first embodiment in FIG. 4B, since the distance d2 between the neighboring pixel electrodes 25 is set to approximately 8 μm, those regions, having the width d3, above the central pixel electrode 25 which are influenced by the radial electric fields are limited to narrow areas (for example, about 10 μm) compared with those of the known electrophoretic display device 51.

Thus, according to the first embodiment, since the distance d2 between neighboring pixel electrodes 25 of the plurality of pixel electrodes 25 is made to be 5 μm or more, the neighboring pixel electrodes 25 will be less affected by the mutual influence of leakage electric fields, and hence unfavorable influence of cross-talk is alleviated. This allows favorable display quality to be maintained. Further, in the first embodiment, by making the distance between the neighboring pixel electrodes 25 be 100 μm or less, high-resolution display is realized while influence of cross-talk is alleviated.

Second Embodiment

Next, a second embodiment according to the present invention will be described. In the second embodiment, a segmented electrophoretic display device is described as an example.

Figure 5:
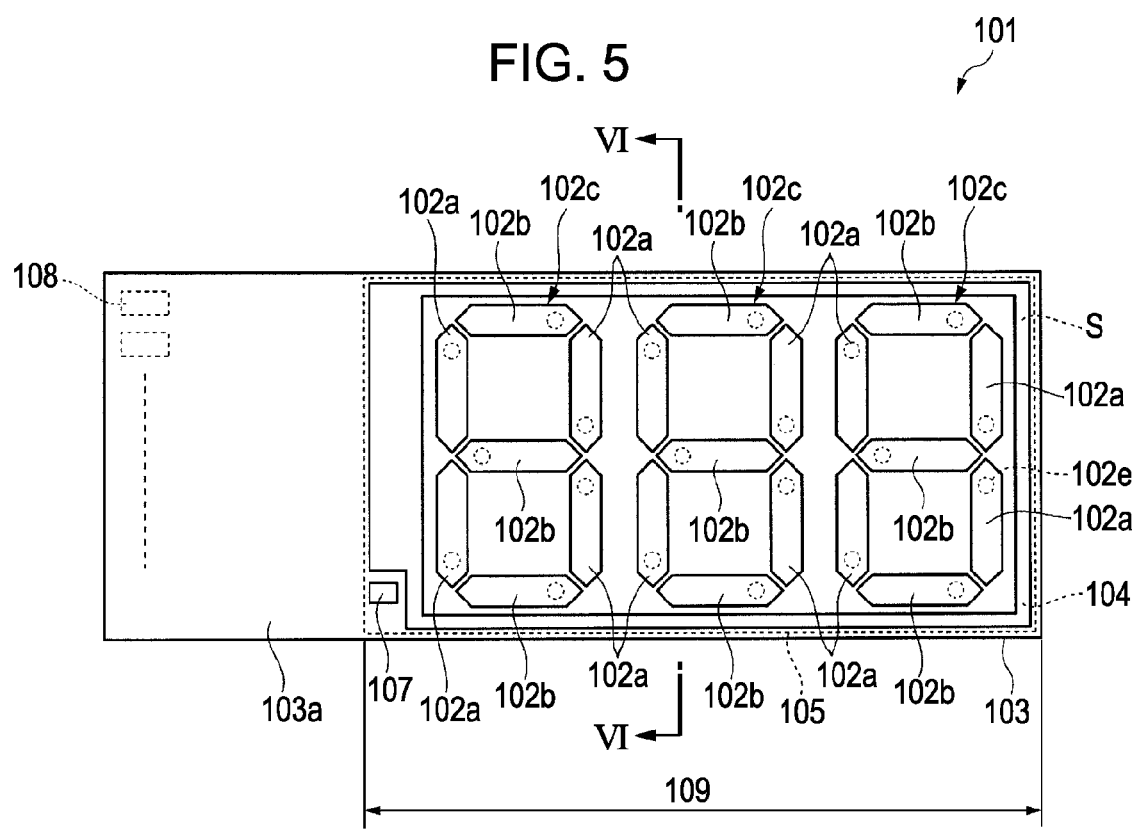
FIG. 5 is a plan view showing a structure of an electrophoretic display device according to a second embodiment of the invention.
Figure 6:
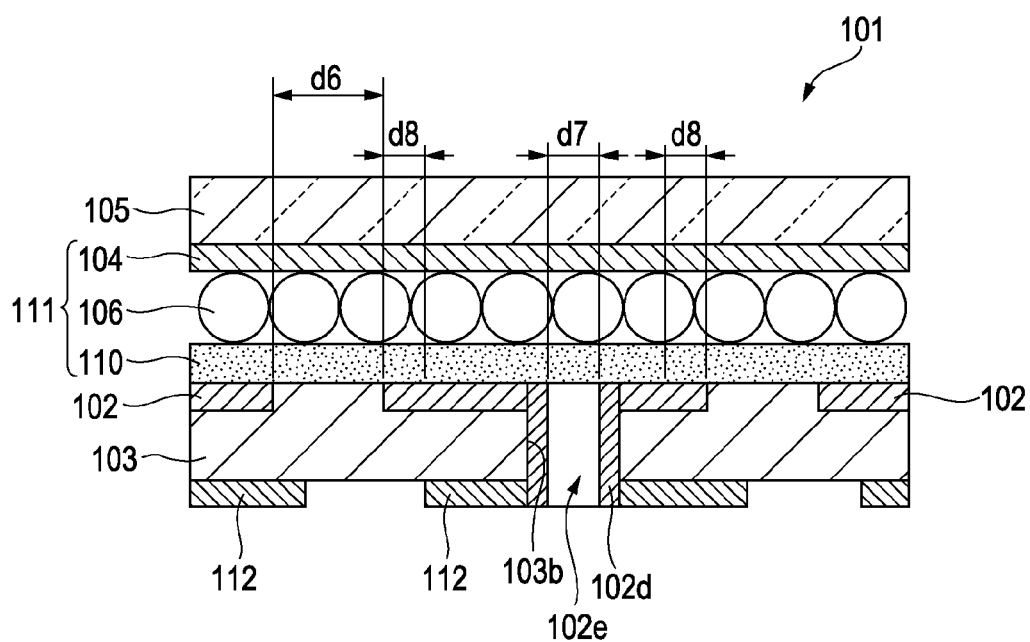
FIG. 6 is a sectional view of the electrophoretic display device.

FIG. 5 shows an electrophoretic display device 101 according to the second embodiment of the invention. FIG. 6 is a sectional view of the electrophoretic display device 101 taken along the line VI-VI of FIG. 5, and corresponds to FIG. 3 of the first embodiment. Note that in the drawings, in order to make the individual layers and components recognizable, different scales are used for the individual layers and components.

As shown in FIGS. 5 and 6, an electrophoretic display device 101 is provided with an element substrate 103 that includes a plurality of pixel electrodes 102 in an display region 109, and an electrophoretic sheet 111 that has a structure in which a common electrode 104, microcapsules 106 and an adhesive layer 110 are stacked on a transparent substrate 105 and this stack is bonded to the display region 109 of the element substrate 103 via the adhesive layer 110.

The element substrate 103 and the transparent substrate 105 are respectively made of materials similar to those of the element substrate 2 and the transparent substrate 30 of the first embodiment. A protruding portion 103a of the element substrate 103 protrudes beyond the transparent substrate 105. The following components are formed on a surface of the protruding portion 103a opposite the surface on which the plurality of pixel electrodes 102 are formed: terminals 108 to which a flexible substrate (not shown) is connected; and wiring lines 112 extending from the plurality of pixel electrodes 102 and a vertically connecting conductor 107 to the terminals 108. The plurality of pixel electrodes 102 and the wiring lines 112 are made of a metal such as copper. The surfaces of the plurality of pixel electrodes 102 and the wiring lines 112 may be nickel-plated and then gold-plated.

In the display region 109 of the upper side of the element substrate 103, the plurality of pixel electrodes 102 designed to have a specified shape are formed. In the second embodiment, each of the pixel electrodes 102 is formed of seven segment electrodes 102a and 102b, i.e., four segment electrodes 102a and three segment electrodes 102b each shaped like an elongate hexagon. The seven segment electrodes 102a and 102b are arranged in a figure-of-eight shape (a so-called seven-segment shape). The electrodes 102a are arranged in such a manner that their longitudinal axes are parallel to the short side of the element substrate 103, and the electrodes 102b are arranged in such a manner that their longitudinal axes are parallel to the long side of the element substrate 103.

In the second embodiment, the seven segment electrodes 102a and 102b are collectively denoted by a segment-electrode group 102c. One segment-electrode group 102c can display FIGS. 0 through 9. Although three segment-electrode groups 102c are arranged to display three-digit numbers in the second embodiment, less than three or more than three segment-electrode groups 102c may be arranged. A distance d6 between neighboring segment electrodes 102a and 102b, which is preferably from 5 to 100 μm, is approximately 50 μm in the second embodiment. Making the distance d6 be approximately 50 μm allows sufficient manufacturing tolerance of the substrate and lower manufacturing cost.

As shown in FIG. 6, a through hole 103b is provided for each of the segment electrodes 102a and 102b of the electrophoretic display device 101, in such a manner as to extend through the segment electrode 102a or 102b and the element substrate 103, at a position that overlaps the segment electrode 102a or 102b in plan view. The through holes 103b are formed, for example, by drilling through the segment electrodes 102a and 102b, the element substrate 103, and the wiring lines 112, after the segment electrodes 102a and 102b, and the wiring lines 112 have been formed on the element substrate 103.

Each of the through holes 103b is provided with a connecting part 102d on its inner surface. The connecting part 102d is formed along and covers the inner surface of each of the through holes 103b. One end of the connecting part 102d is connected to the segment electrode 102a or 102b, and the other end of the connecting part 102d is connected to the wiring line 112 that is provided on a surface of the element substrate 103 opposite the surface having the segment electrodes 102a and 102b. The central portion of the connecting part 102d in plan view has a continuous hole 102e that continues from one end to the other end of the connecting part 102d. The diameter d7 of the continuous hole 102e, which is preferably 100 μm or less, is approximately 80 μm, for example, in the second embodiment. The connecting parts 102d are formed by plating the through holes 103b after the through holes 103b have been formed.

It should be noted that the diameter d7 of the continuous holes 102e is determined on the basis of the assumption that the separation between the pixel electrodes 25 and the common electrode 35 is 90 to 100 μm. When the separation is different from that of the assumption, the diameter d7 can be appropriately calculated on the basis of the ratio of the separation and the diameter d7.

Referring to FIG. 6, when a voltage is applied between the common electrode 104 and the left and right pixel electrodes 102 of the figure, in such a manner that the potential of the pixel electrodes 102 is higher than that of the common electrode 104, radial electric fields are generated at the ends of the left and right pixel electrodes 25 closer to the central pixel electrode, and extend to the regions above the neighboring central pixel electrode 102. In the structure of the second embodiment, the distance d6 between neighboring pixel electrodes 102 is set to approximately 50 μm. Therefore, regions having a width d8 which are influenced by the radial electric fields are limited to narrow areas compared with those of known electrophoretic display devices.

Thus, according to the second embodiment, unfavorable influence of cross-talk is alleviated and favorable display quality is maintained in the so-called segmented display structure, in which the plurality of pixel electrodes 102 are the segment electrodes 102a and 102b arranged in a specified pattern. Further, according to the second embodiment, sufficiently strong electric fields are applied to those portions of the display region which correspond to the continuous holes 102e. This is because a diameter of 100 μm or less is chosen as the diameter d7 of the continuous holes 102e of the connecting parts 102d that are formed along and covers the inner surfaces of the through holes 103b, where each of the through holes 103b is provided at a position that overlaps the segment electrode 102a or 102b in plan view, for the plurality of segment electrodes 102a and 102b of the element substrate 103. In other words, the diameter d7 is optimized so that the electric field from the edge of the pixel electrode 102 surrounding the continuous hole 102e causes cross-talk, which allows the portion of the display region corresponding to the continuous hole 102e to display information similarly to the surrounding portions. Hence, the formation of dots or circles of uneven contrast can be prevented in the display region, such dots or circles being often observed in existing electrophoretic display devices. As a result, degradation in display quality can be avoided more reliably, and favorable display quality is maintained in the segmented display structure.

Electronic Apparatus

Hereinafter, electronic apparatuses are described to which the above-described electrophoretic display device 1 or 101 is applied.

Figure 7:
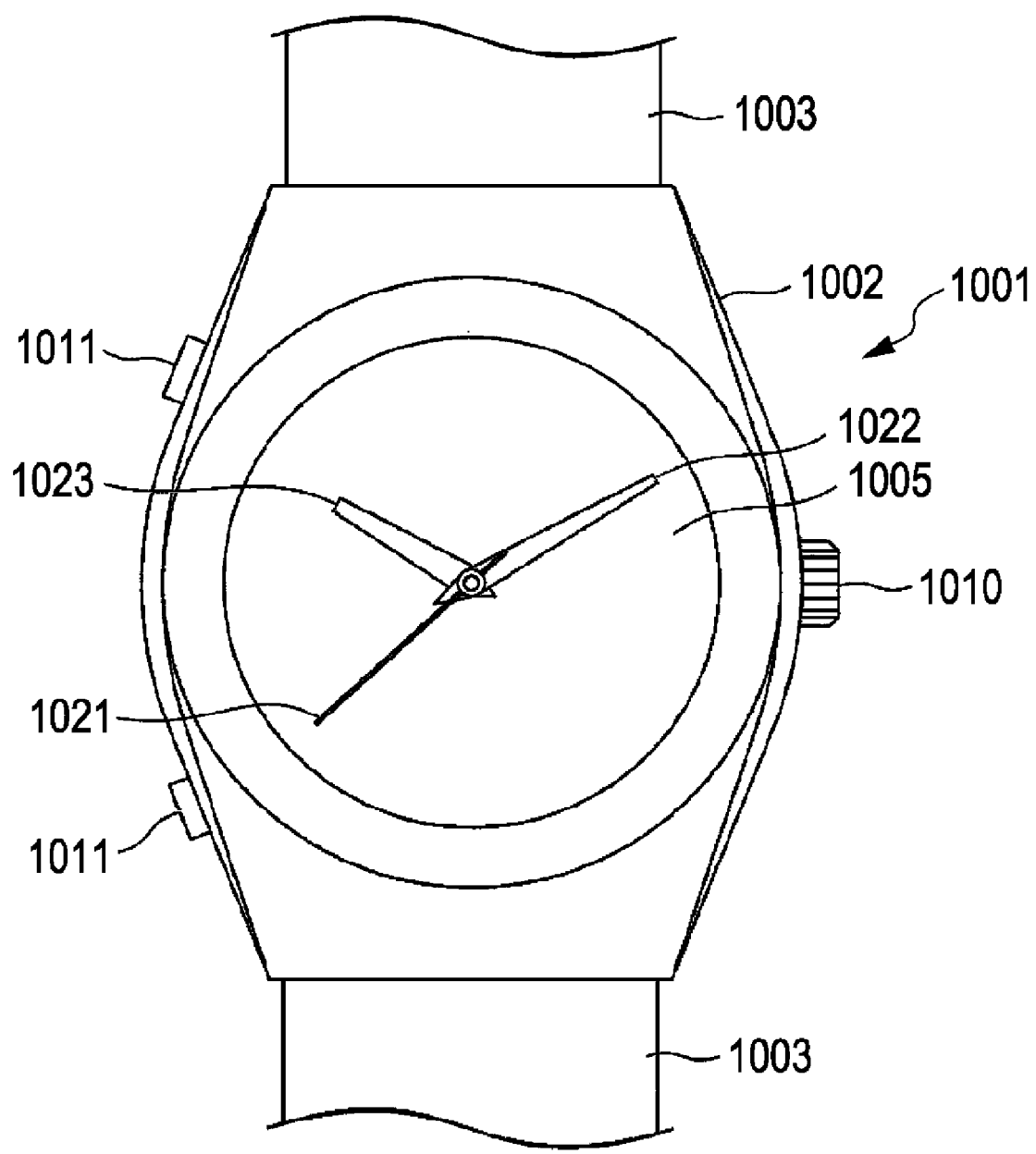
FIG. 7 illustrates a wrist watch as an example of an electronic apparatus.

FIG. 7 is a front view of a wrist watch 1001. The wrist watch 1001 is equipped with a case 1002 and a pair of bands 1003 connected to the case 1002.

On the front of the case 1002 are provided a display unit 1005 including the electrophoretic display device 1 or 101 according to the above-described embodiments, a second hand 1021, a minute hand 1022, and an hour hand 1023. On the side of the case 1002 are provided a crown 1010 and operation buttons 1011, which function as operation controllers. The crown 1010, linked to a setting stem (not shown) provided in the case 1002, is rotatably fixed in such a manner as to allow it to be pulled out and pushed in together with the setting stem in multi steps (such as two steps). A display 1005 can display, among others, images such as a background image; character strings such as a date and a time of day; or a second hand, a minute hand, and an hour hand.

Figure 8:
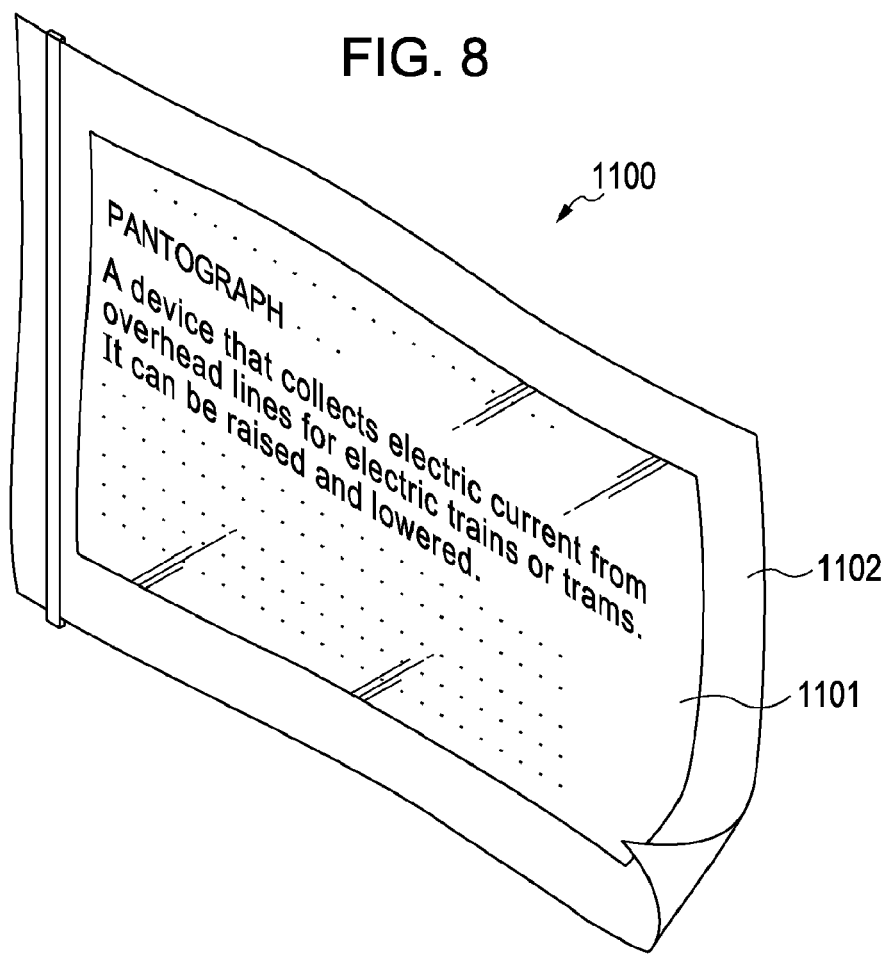
FIG. 8 illustrates electronic paper as an example of an electronic apparatus.

FIG. 8 is a perspective view showing a structure of electronic paper 1100. The electronic paper 1100 is provided, in its display region 1101, with an electrophoretic display device that is substantially similar to the above-described electrophoretic display device 1 or 101 of the embodiments. This electrophoretic display device has a structure in which the glass cover 4 has been removed from the electrophoretic display device 1 shown in FIG. 2. The electronic paper 1100 is flexible, and is configured to have a main body 1102 that includes a rewritable sheet that has texture and flexibility similar to conventional paper.

Figure 9:
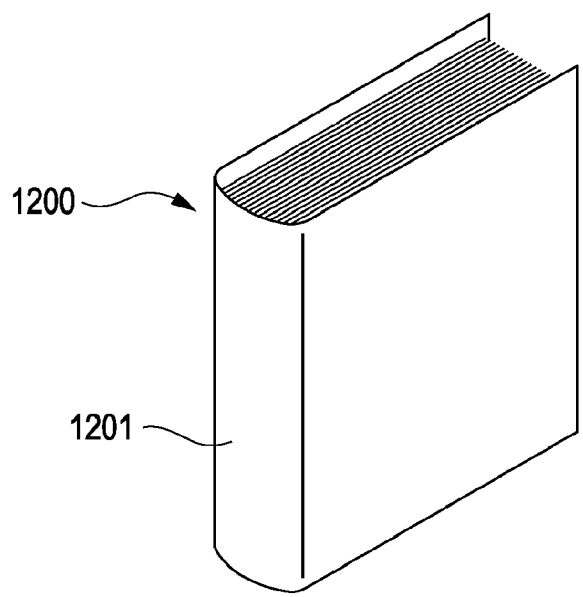
FIG. 9 illustrates an electronic notebook as an example of an electronic apparatus.

FIG. 9 is a perspective view showing a structure of an electronic notebook 1200. The electronic notebook 1200 has a structure in which a plurality of sheets of the above-described electronic paper 1100 are covered by a cover 1201. The cover 1201 has, for example, a display-data input unit (not shown) that inputs data sent from an external apparatus, allowing the displayed content to be modified or updated in accordance with the input data, while the sheets of electronic paper are kept stacked in the cover.

The above-described wrist watch 1001, the electronic paper 1100, and the electronic notebook 1200, which are provided, in their display regions, with the electrophoretic display device 1 or 101 according to the embodiments of the invention, are electronic apparatuses that have high grade display characteristics.

The electronic apparatuses shown in FIGS. 7 to 9 are examples according to embodiments of the invention, and do not to limit the scope of the technology covered by the invention. For example, an electrophoretic display device according an embodiment of the invention is suitably applicable to the display of an electronic apparatus, such as a cellular phone and a portable audio apparatus.

The invention is not limited to the above technology areas, and various modifications as appropriate are possible within the scope and spirit of the invention.

The entire disclosure of Japanese Patent Application No. 2008-066227, filed Mar. 14, 2008 is expressly incorporated by reference herein.

What is claimed is:

1. An electrophoretic display device comprising:
   a first substrate having a plurality of pixel electrodes in a display region thereof, a distance between neighboring pixel electrodes among the plurality of pixel electrodes being 5 μm or more, the plurality of pixel electrodes being a plurality of segment electrodes arranged in a specified pattern;
   a through hole provided for each of the plurality of segment electrodes in such a manner as to extend through the first substrate and one of the segment electrodes, at a position that overlaps the segment electrode in plan view;
   a connecting part, formed along and covering an inner surface of the through hole, one end of which is connected to the segment electrode and the other end of which is connected to a surface of the first substrate opposite a surface having the pixel electrodes, the connecting part having a continuous hole that continues from the one end to the other end of the connecting part, located at a central portion of the connecting part in plan view, the continuous hole having a diameter of 100 μm or less; and
   an electrophoretic sheet that includes a second substrate on which a common electrode, an electrophoretic layer, and an adhesive layer are laminated, the electrophoretic sheet being bonded to the display region of the first substrate via the adhesive layer.

2. The electrophoretic display device according to claim 1, wherein the distance between neighboring pixel electrodes among the plurality of pixel electrodes is 100 μm or less.

3. The electrophoretic display device according to claim 1, wherein the first substrate has a switching element corresponding to each of the plurality of pixel electrodes.

4. An electronic apparatus including the electrophoretic display device according to claim 1.

* * * * *